US008719756B2

(12) United States Patent
Li et al.

(10) Patent No.: US 8,719,756 B2
(45) Date of Patent: May 6, 2014

(54) POWER GRID MOSAICING WITH DEEP-SUB-TILE CELLS (75) Inventors: Mu-Jing Li, Santa Clara, CA (US); Timothy Johnson, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/267,081

(22) Filed: Oct. 6, 2011

(65) Prior Publication Data

US 2013/0091478 A1    Apr. 11, 2013

(51) Int. Cl.
*G06F 17/50* (2006.01)
(52) U.S. Cl.
USPC ............................ 716/125; 716/118; 716/135
(58) Field of Classification Search
USPC ........................................................ 716/135
See application file for complete search history.

(56) References Cited

U.S. PATENT DOCUMENTS

| | | |
|---|---|---|
| 7,007,258 B2 | 2/2006 | Li |
| 7,096,447 B1 | 8/2006 | Li et al. |
| 7,380,227 B1 | 5/2008 | Li |
| 7,519,929 B2 | 4/2009 | Li |
| 7,847,408 B2 | 12/2010 | Masleid et al. |
| 2008/0127025 A1* | 5/2008 | Zorrilla et al. .................. 716/12 |
| 2009/0055789 A1* | 2/2009 | McIlrath ......................... 716/10 |
| 2009/0321791 A1* | 12/2009 | Wagner ......................... 257/207 |
| 2011/0209105 A1* | 8/2011 | Zhang ............................ 716/53 |

\* cited by examiner

*Primary Examiner* — Paul Dinh
*Assistant Examiner* — Bryce Aisaka
(74) *Attorney, Agent, or Firm* — Miles & Stockbridge, P.C.

(57) ABSTRACT

A computer aided design system can determine coverage of a metal layer mosaic. The system can apply a tile pattern to a design including at least one layer. Then, the system can identify at least one tile of the tile pattern that violates at least one first design rule. After that, the system can apply a sub-tile pattern to an area identified in the identifying the at least one tile of the tile pattern that violates the design rule. The system further can identify at least one sub-tile of the sub-tile pattern that violates at least one second design rule. Finally, the system can apply a deep-sub-tile pattern to an area identified in the identifying the at least one sub-tile of the sub-tile pattern that violates the second design rule.

20 Claims, 8 Drawing Sheets

POWER GRID MOSAICING WITH DEEP-SUB-TILE CELLS

FIELD

One embodiment is directed generally to a computer system, and in particular to a computer design and analysis tool for integrated circuit design.

BACKGROUND INFORMATION

Figure 1:
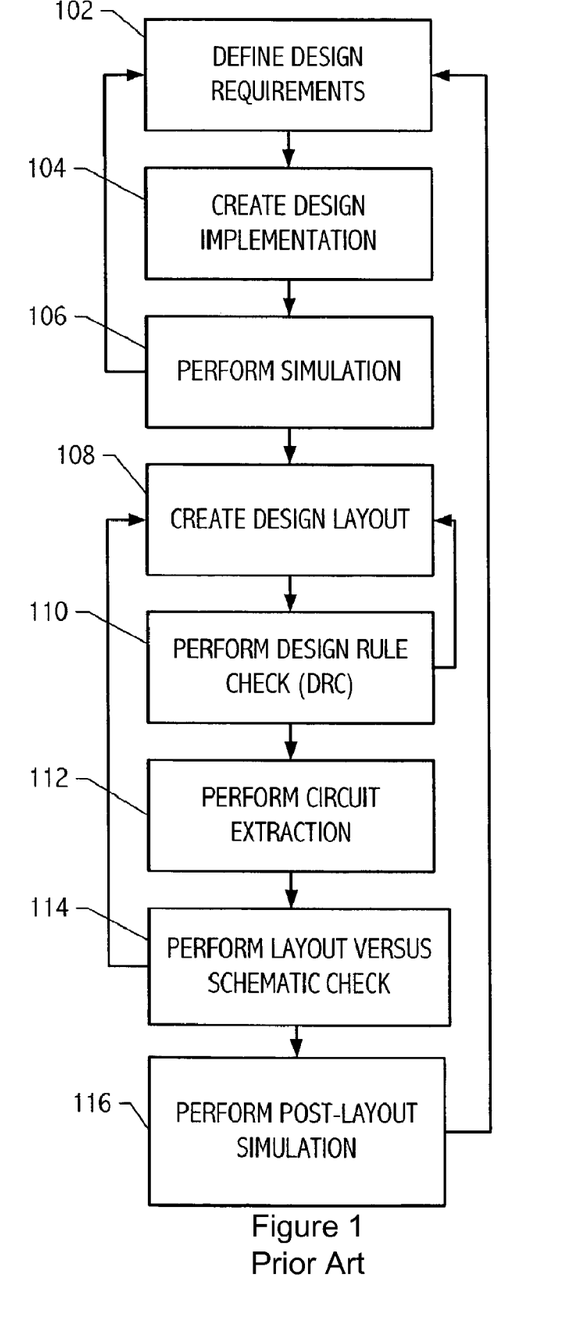
FIG. 1 is a block diagram illustrating the prior art design flow.

Design of electronic circuits and chips, for example, an integrated circuit (IC) involves a variety of steps. FIG. 1 illustrates a typical design flow 100 of an integrated circuit device from conception through the generation of a fabrication-ready design layout. Generally, design flow 100 begins at 102 with defining the design specifications or requirements, such as required functionality and timing. The requirements of the design are implemented, for example, as a net-list or electronic circuit description, at 104. The implementation can be performed by, for example, schematic capture (drawing the design with a computer aided design tool) or utilizing a high level description language such as very-high-speed integrated circuit (VHSIC) hardware description language (VHDL), Verilog® and the like. At 106, the implemented design is simulated to verify design accuracy. Design implementation and simulation are iterative processes. For example, errors found by simulation are corrected by design implementation and re-simulated.

Once the design is verified for accuracy with simulation, a design layout of the design is created, at 108. The design layout describes the detailed design geometries and the relative positioning of each design layer to be used in actual fabrication. The design layout is associated with overall circuit performance (area, speed and power dissipation) because the physical structure defined by the design layout determines, for example, the transconductances of the transistors, the parasitic capacitances and resistances, and the silicon area that is used to realize a certain function. The detailed design layout requires design effort and is typically performed utilizing specialized computer aided design (CAD) or Electronic Design Automation (EDA) tools.

The design layout is checked against a set of design rules in a design rule check (DRC), step 110. The created design layout is intended to conform to a complex set of design rules in order, for example, to ensure a lower probability of fabrication defects. The design rules specify, for example, how far apart various layers must be, or how large or small various aspects of the layout must be for successful fabrication, given the tolerances and other limitations of the fabrication process. A design rule can be, for example, a minimum spacing amount between geometries and is typically closely associated to the technology, fabrication process and design characteristics. For example, different minimum spacing amounts between geometries can be specified for different sizes of geometries. DRC is a time-consuming iterative process that conventionally often requires manual manipulation and interaction by the designer. The designer performs design layout and DRC iteratively, reshaping and moving design geometries to correct all layout errors and achieve a DRC clean (violation free) design. Among the design rules that exist are design rules for metal enclosures for vias. For example, some such design rules are asymmetric metal enclosure rules, which require more metal enclosure at the metal path end, while allowing less metal enclosure at the metal path side.

Circuit extraction is performed after the design layout is completed and error free, at 112. The extracted circuit identifies individual transistors and interconnections, for example, on various layers, as well as the parasitic resistances and capacitances present between the layers. A layout versus schematic (LVS) check is performed, at 114, where the extracted net-list is compared to the design implementation created at 104. LVS ensures that the design layout is a correct realization of the intended circuit topology. Any errors such as unintended connections between transistors, or missing connections/devices, or the like are corrected in the design layout before proceeding to post-layout simulation, at 116. The post-layout simulation is performed using the extracted net-list which provides a clear assessment of the circuit speed, the influence of circuit parasitics (such as parasitic capacitances and resistances), and any glitches that can occur due to signal delay mismatches. Once post-layout simulation is complete and all errors found by DRC are corrected, the design is ready for fabrication and is sent to a fabrication facility.

As electronic circuit densities increase and technology advances, for example, in deep-sub-micron circuits, skilled designers attempt to maximize the utilization of the design layout and the manufacturability and reliability of the circuit. Deep-sub-micron designs typically have stringent design rules that are often not recognized by EDA tools, for example, automated place and route tools. Therefore, when creating a design layout in step 108, for example, many design rule violations can be created that must be corrected.

One area where design rules have become particularly important is in the area of metal layers and vias. A via is used to connect, for example, two design geometries, one on each of two consecutive conductive layers (e.g., a metal line on each of two consecutive metal layers) of an electronic circuit. For example, it can be important to ensure that each connection area between two conductive layers has at least a certain number of vias and/or has vias placed appropriately to reduce the risk of via failure due to vacancy concentration of isolated vias.

SUMMARY

One embodiment is a computer aided design system that determines coverage of a metal layer mosaic. The system applies a tile pattern to a layer. Then, the system identifies at least one tile of the tile pattern that violates at least one design rule. After that, the system applies a sub-tile pattern to an area identified in the identifying the at least one tile of the tile pattern that violates the design rule. The system further identifies at least one sub-tile of the sub-tile pattern that violates at least one design rule. Finally, the system applies a deep-sub-tile pattern to an area identified in the identifying the at least one sub-tile of the sub-tile pattern that violates the design rule.

DETAILED DESCRIPTION

One embodiment is a computer system that uses deep-sub tiling to provide mosaic coverage in chip design. This produces, in certain embodiments, the advantage of maximizing the power grid mosaic coverage while minimizing the time to compute such coverage.

Figure 2:
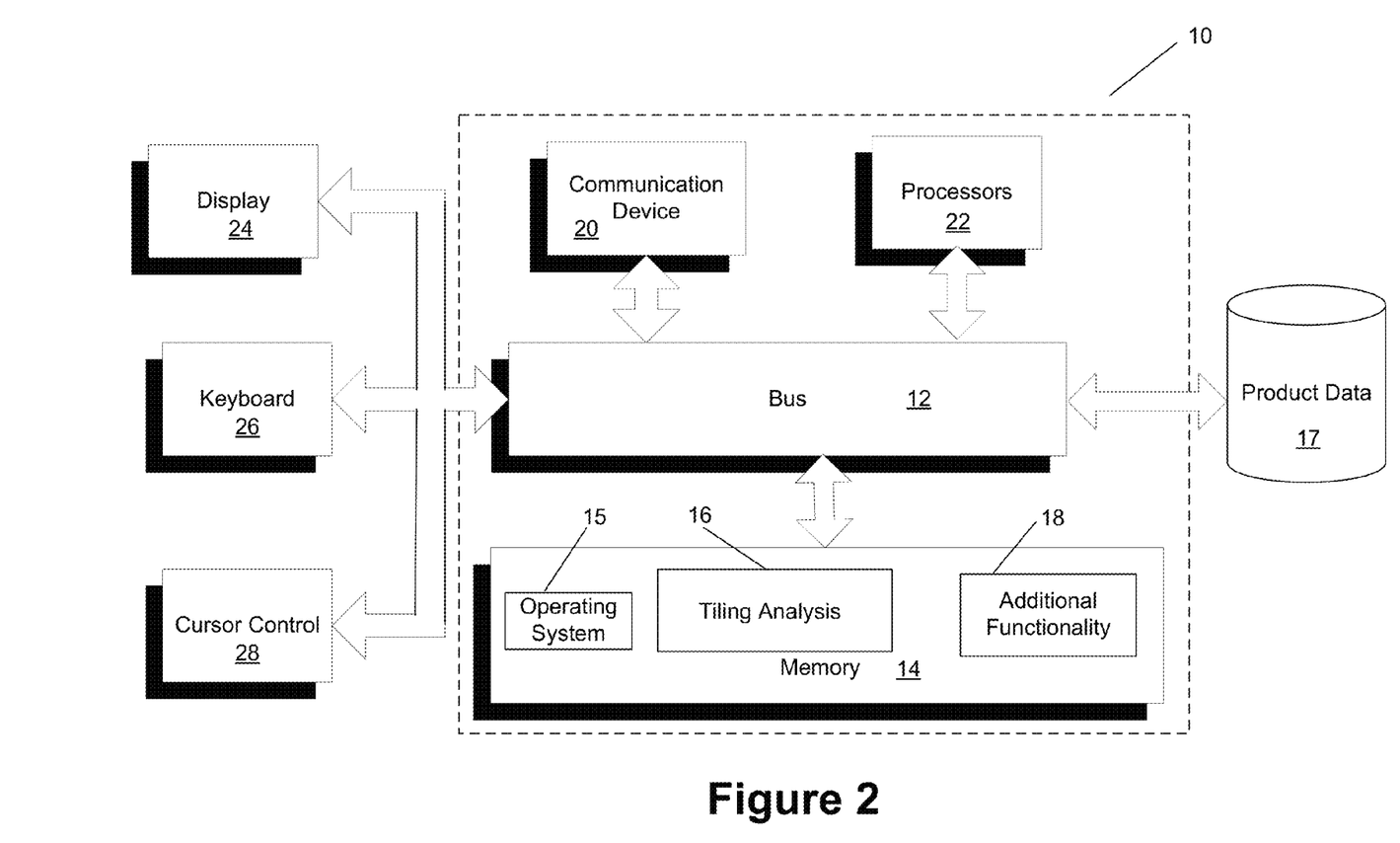
FIG. 2 is a block diagram of a computer system that can implement an embodiment.

FIG. 2 is a block diagram of a computer system 10 that can implement an embodiment. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor capable of processing multiple instructions in parallel. In one embodiment, processor 22 is an individual multi-core processor, but may be implemented using multiple individual processors in communication with each other, or any other type of processor or processors that is capable of parallel computing. In alternative embodiments, processor 22 may be an individual single-core processor.

System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. A non-transitory computer readable medium, for example, can be employed as the memory 14. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, touch screen, or trackball device, is further coupled to bus 12 to enable a user to interface with system 10.

In one embodiment, memory 14 stores software modules that provide functionality when executed by processor 22. The modules include an operating system 15 that provides operating system functionality for system 10. The modules further include a tiling analysis module 16 that analyzes tiling of cells for a mosaic of one or more metal layers, as disclosed in more detail below. System 10 can be part of a larger system, such as an computer aided design tool system. Therefore, system 10 can include one or more additional functional modules 18 to include the additional functionality, for example, other electronic design tools. A database 17 is coupled to bus 12 to provide centralized storage for modules 16 and 18 and store specifications for flip-flops and other memory or logic devices, circuit board specifications, etc.

Tiling can be performed in a variety of ways. For example, an orthogonal placement grid can be defined including multiple locations, with each location identified by an integer x-coordinate and an integer y-coordinate. Even locations within the grid can be identified, where a location is even if an integer representing a sum of the location's x-coordinate and y-coordinate is mathematically even. In one example, a tile is assigned to each even location and each assigned tile is assigned an orientation relative to a selected origin. The tiles are placed in a representation corresponding to a metal layer of the semiconductor device in accordance with the assignments. The tiles can correspond to various features, including tiles that represent a portion of an integrated clock and power distribution.

In a specific example, a first tile is assigned to a location on a placement grid corresponding to a top metal layer. Next, an orientation is assigned to the first tile relative to the top metal layer placement grid. Then, the first tile is placed on a representation corresponding to the top metal layer in accordance with the assignments. A second tile is similarly assigned to a location on a placement grid corresponding to a top-1 metal layer. The orientation of the first tile can be assigned to the second tile relative to the top-1 metal layer placement grid. Then the second tile is placed on a representation corresponding to the top-1 metal layer in accordance with the assignments. The first tile and the second tile can be arranged as a coordinated structure, such as a full-dense-mesh (FDM) distribution structure. In this example, the first tile is an integrated clock and power distribution structure. The second tile is a low impedance underpass structure corresponding to the integrated clock and power distribution structure. However, these structures are simply examples.

In general, a mosaic can be an arrangement of tiles throughout the grid. The area of the grid corresponding to each tile can be referred to as a cell. Thus, if a grid is completely covered by tiles, each cell of the grid will be covered by a tile, and the whole grid will be covered by a mosaic of tiles. However, because of the relationship between tiles and cells, grid and mosaic, the various terms can sometimes be used interchangeably, such that it may be said that a mosaic is made up of cells, or a grid is composed of tiles.

A large scale design contains power grid networks, which are connected through vias in their intersection areas. To place (in a design) a large amount of vias can take a very long time, for example, up to a week. Placing this large amount of vias can also inflate the database size. Both issues can slow down the turn-around time of a design.

Power grids in a design are usually patterned either horizontally or vertically (or both). A tile cell with a given pattern can be created and placed repeatedly in both horizontal and vertical directions with the same orientation to cover a whole design. This can be considered "mosaicing" in general.

A pattern, in turn, can be constructed based on a sub pattern. Thus, a tile (corresponding to the pattern) can be composed of a sub-tile cell (containing the sub pattern), which is placed multiple times with different orientation to cover different parts of the pattern to form a complete pattern or a tile cell. Vias are placed only in the lowest tile cells; when the tile cells are placed as a mosaic across the board, vias will be placed everywhere. In other words, vias and metals are contained in the deep sub-tiles (when deep sub-tiles are present) or the sub-tiles (when deep-sub-tiles are not present). An upper level cell, also called a parent tile cell, may simply hold instances of the child cells in the parent cell. This embodiment can minimize the number of vias to be placed in a design, and can shorten the run time involved in the design.

In a real design, there are typically some areas that cannot follow the global power grid patterns, for example, static random-access memory (SRAM) blocks. In other words, while ideally a power grid mosaic would cover the whole circuit design, in reality, some exceptions will apply. However, each tile cell of a power grid may have a pitch (the pitch is a measurement of one side of the tile cell, in the case of a square tile cell) with dimensions that are much larger than a design entity (for example, much larger than a metal strap width or a via). Thus, a tiny area mismatch can cause a whole tile or a sub-tile to be peeled from the mosaic array. Because the complexity of the design, if there are many such small areas, that could cause many whole tile cells to be peeled. Thus, the coverage from the use of tiles and sub-tiles may not save as much time as would be liked.

The symmetrical pattern or sub pattern, therefore, can be viewed as providing a barrier that prevents maximization of the area that can be covered. This can be remedied by smaller asymmetrical tile cells. Certain embodiments, therefore, maximize the tile cell coverage by using a set of "deep-sub-tile" cells.

In certain embodiments, a deep-sub-tile cell is fundamentally different from a tile cell or a sub-tile cell. A deep-sub-tile represents a unique part in an upper level tile cell and could not be placed in the way a tile cell or a sub-tile cell can be placed. Although the implementation and extraction of a deep-sub-tile cell are more complicated than for a tile cell or a sub-tile cell, the use of the deep-sub-tile can avoid the traditional tile cell restriction that the tile cell has to be in a certain repeatable pattern with respect to other tile cells.

Thus, in certain embodiments a tile cell contains a pattern that can be placed repeatedly in the same orientation. A sub-tile cell contains a symmetric part of the pattern. The sub-tile cell can be placed in different orientations in combination to form a tile cell that contains a complete pattern. By contrast, a deep-sub-tile cell contains an asymmetric part of an upper level tile cell that could not be formed by any sub-tile cell. Therefore, only a set of deep-sub-tile cells can be used to form the upper level tile cell. The set of deep-sub-tile cell is formed by dividing the upper level tile cell into several parts, such as four, nine, or sixteen parts in a way that is best fit to the design topology and easy for the tools to deal with.

In general, an upper level tile cell can be divided into any number of parts to form a set of deep-sub-tile cells. Since each deep-sub-tile cell corresponds to a specific part of the upper level tile cell, in certain cases the deep-sub-tiles can be different in size from one another and can be polygon shapes (for example, shapes other than squares or rectangles). The only requirements can be, for example, that the deep-sub-tile can stand on its own without violating the design rules, and that the deep-sub-tiles as a group can be pieced together to form the original upper level tile cell. Based on the above factors, the guidelines for dividing an upper level tile cell can be that each deep-sub-tile cell should keep the integrity of metal and via. Thus, when the deep-sub-tile cell is placed individually, the deep-sub-tile cell still meets design rules.

Because of the way a set of deep-sub-tile cell is created, the location of each deep-sub-tile cell relative to the upper level tile cell is fixed in an embodiment. Therefore, the rotation of the set of deep-sub-tile cells should be the same as the upper tile cell. For a specific part of an upper tile cell in a certain orientation, a computer system can calculate which deep-sub-tile cell should be used in that area and in which orientation that deep-sub-tile should be arranged.

For example, an upper level tile cell (e.g., a sub-tile cell rather than a deep-sub-tile cell) with orientation "R0" contains four deep-sub-tile cells. Without them, a mismatch in the lower left corner of the tile cell will cause the whole tile to be peeled. By contrast, with the deep-sub-tile cells, only the deep-sub-tile cell at the violation location should be peeled, and the other three deep-sub-tile cells can be kept. In other words, instead of peeling an upper level tile cell, three deep-sub-tile cells can be placed in the lower right corner, upper left corner, and upper right corner of the upper level tile cell location in the proper orientation. Thus, there can be a 75% improvement in coverage (in this example). If a set of 16 deep-sub-tile cells are used, and the mismatch is only related to one of the cells, then the gain could be 94%.

With certain embodiments, the design process is no longer restricted by the power grid pattern or sub pattern. Instead, the design process can maximize the deep-sub-tile coverage across the board of a design to close the mismatch as much as desired. Since the dimensions of the deep-sub-tile cell may be comparable to the design entities, the leftover locations for filling a via in the vicinity of a mismatch is limited, and the via fill time for the leftover power grid and signals for devices such as Sparc® cores from Oracle Corp. can be shortened dramatically. The reduction in processing time can be significant enough to reduce a turn-around time from about seven days to about eleven hours.

A SKILL® based tool from, for example, Oracle Corp. can be implemented utilizing certain embodiments. SKILL is a high level coding language that allows the manipulation of individual objects in a design database. SKILL® is a registered trademark of and is available from Cadence Design Systems, Inc. of San Jose, Calif. However, SKILL is simply an example of a programming language understood by computer aided design (CAD) tools and used for manipulating design layouts. A system utilizing the tool can use the tile cell mosaics to cover a complex design as its power grid network. The following is a specific example.

First, a library of tile cells is created. The tile cells are in metal layer groups. Within the metal layer groups, the layers follow the same pitch and topology, for example, there may be three groups: M11-M7, M7-M5, and M5-M3. In this context, Mi refers to a metal layer, in which "i" corresponds to a particular number of the metal layer. For example, M1 refers to metal1, M2 refers to metal2, and so on. The metal layers can be numbered consecutively in order of vertical position, with metal1 (M1) corresponding to the layer closest to the "bottom" of the chip. In this example, the first two groups (M11-M7 and M7-M5) use a 16.64 micron pitch and the last group (M5-M3) uses a 4.16 micron pitch.

For the M11-M7 group a sub-tile cell can have a sub pitch of 8.32 micron. The reason for this selection of sub-tile cell pitch can be based on experience of what degree of coverage can be obtained with a given pitch. A tile cell of 16.64 micron pitch is constructed from sub-tile cells of 8.32 micron pitch. The sub-tiles are presented in different orientations to complete the design of the tile cell. There may not be any deep-sub-tiles for the M11-M7 group, because the coverage may be good enough, because there may be fewer irregularities to address.

For the M7-M5 group, tile cell and sub-tile cell may be 16.64 microns and 8.32 microns respectively, as with the M11-M7 group. Additionally, a set of deep-sub-tile cells can be pitched at 4.16 microns.

For the M5-M3 group, the sub-tile cell and the deep-sub-tile cells can be pitched at 2.08 microns and 1.04 microns, with a tile cell pitch of 4.16 microns.

Only the lowest tile cells contain real metal and vias. In other words, vias and metals are contained in the deep sub-tiles (when deep sub-tiles are present) or the sub-tiles (when deep-sub-tiles are not present). An upper level cell, also called a parent tile cell, may simply hold instances of the child cells in the parent cell. A sub-tile cell is constructed by a set of deep-sub-tile cells, and a tile cell is constructed by a same sub-tile cell in different orientations. Thus, for a layer group with deep-sub-tile cells (such as the M7-M5 or M5-M3 groups), the design in fact is covered by the set of deep-sub-tile cells.

In this embodiment, each individual deep-sub-tile cell is always located at a fixed place of its parent tile cell, no matter what the orientation of the parent cell is and no matter where the parent cell is placed. Thus, for a specific area of the design, the parent tile cell origin and orientation can be used to identify the placement of a particular, individual deep-sub-tile cell.

For each layer group, a tile cell mosaic can cover the whole design, and a software program, such as Calibre™, an electronic design automation tool from Mentor Graphics Corporation, can be used to figure out those areas where the power grid from the mosaic does not match the power grid from the real design. Those areas that are not involved in a mismatch can be considered good areas for a tile cell, or a sub-tile cell, or a deep-sub-tile cell.

Construction layers for each level of tile cells are placed to help Calibre® figure out whether a deep-sub-tile cell, or a sub-tile cell, or a tile cell array should be placed at a specific area with proper orientation.

Calibre™ outputs a set of construction layers to let a SKILL®-based tool place the tile cells accordingly. The via fill tool can fill vias in those areas that are not covered by power grid tile cells and the run time and via filled number can be reduced in proportion to the improvement in coverage of the mosiac.

Figure 3:
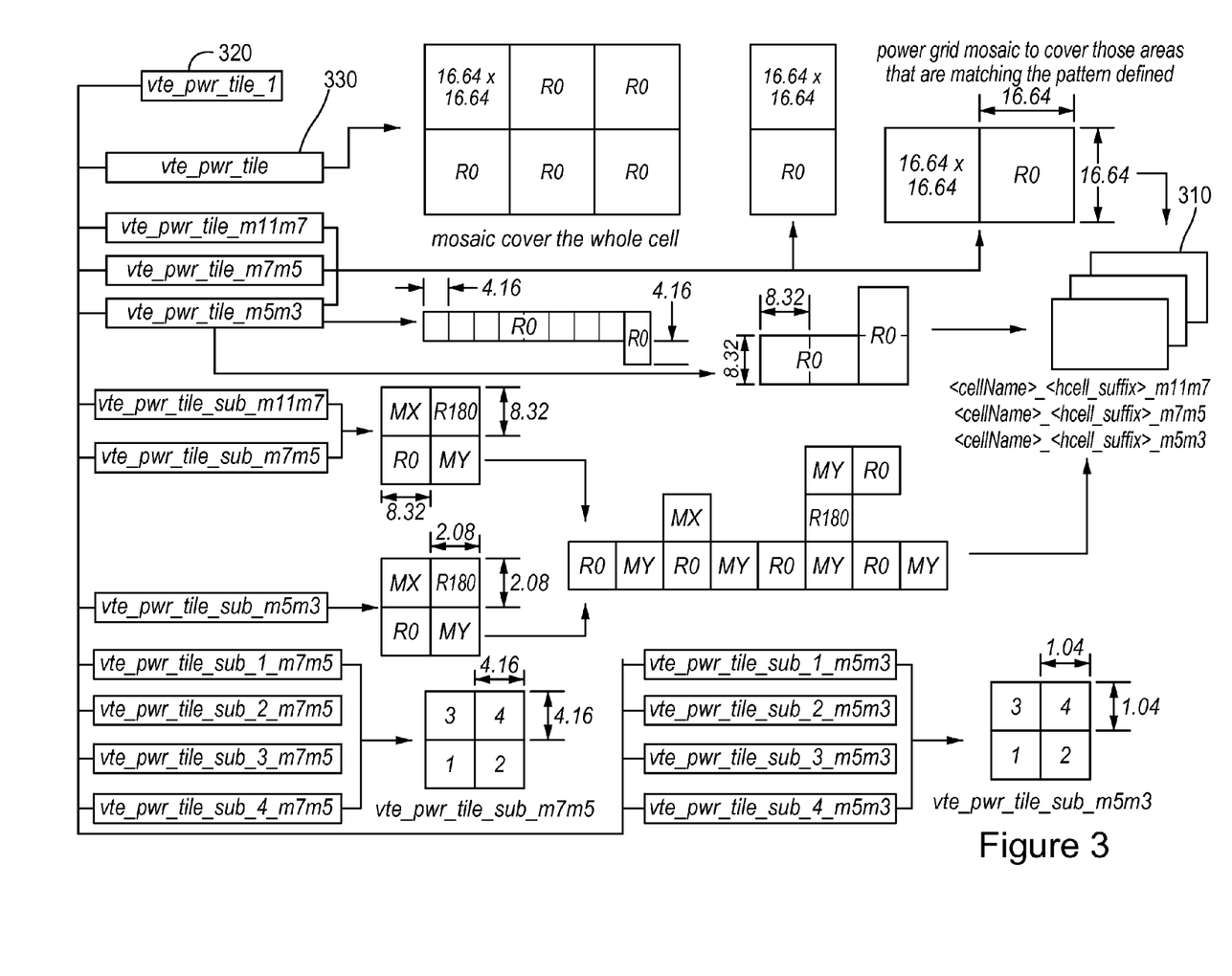
FIG. 3 illustrates tiles, mosaics, and respective layers, according to certain embodiments.

In certain embodiments, the present invention can provide a design flow to extract power grids, for example, "pwr" and "vss" and match them by power grid mosaics. FIG. 3, for example, illustrates tiles, mosaics, and respective layers, according to certain embodiments. The mosaics can be formed of different sizes of tiles to cover a complex design as much as possible. The design flow can generate, for example, four holding cells 310 as follows: <cellName>_<hcell_suffix>, which contains the following three sub holding cells, namely, <cellName>_<hcell_suffix>_m11m7 (which contains M11-M7 mosaics), <cellName>_<hcell_suffix>_m7m5 (which contains M7-M5 mosaics), and <cellName>_<hcell_suffix>_m5m3 (which contains M5-M3 mosaics).

A vte_pwr_tile_l library 320 can be created to hold the tile and sub-tile cells. Besides cell vte_pwr_tile, each tile cell is constructed by one (or more than one) lower level sub-tile cells. Labels and vias are filled properly in the lowest sub-tile cells. In other words, vias and metals are contained in the deep sub-tiles (when deep sub-tiles are present) or the sub-tiles (when deep sub-tiles are not present). An upper level cell, also called a parent tile cell, may simply hold instances of the child cells in the parent cell. Each cell contains a prBoundary object to mark the butting edges of the cell. Some of the metal layers are extended for the integrity of metal strap and via. However, those extending parts are not counted by the matching process, based on the fact that the design itself is following the power grid pattern.

The cell vte_pwr_tile 330 is a special cell to be used only by the flow. To make the flow simpler and to make the flow run faster, the flow can be configured to use M11-M3 drawing purpose to stand for pwr, and use ref purpose to stand for vss. Other cells (other than vte_pwr_tile) are used to form real mosaics or to be placed individually. The lowest tile cell contains metal straps with proper labels and vias. Cell names can be descriptive of the role of the cell in the design, as will be seen below.

For example, vte_pwr_tile_m11m7 is a cell for forming M11-M7 mosaics that are placed in areas bigger than 16.64×16.64 micron with R0 orientation. The R0 orientation can be considered the normal and original orientation, with the orientations being described in reference to the R0 orientation. In the case of a cell tile corresponding to a whole cell, like the cell vte_pwr_tile_m11m7, only the R0 orientation may be used.

Similarly, vte_pwr_tile_sub_m11m7 is a sub cell for forming cell vte_pwr_tile_m11m7 with R0, MY, MX, or R180 orientations, while being placed individually in areas that are bigger than 8.32×8.32 microns but smaller than 16.64×16.64 microns. To cover a whole tile cell, individual sub-tile cells of vte_pwr_tile_sub_m11m7 can be placed with R0, MY, MX, or R180 orientations. The MY orientation can be a mirror image of the R0 orientation about the y-axis, while the MX orientation can be a mirror image of the R0 orientation about the x-axis. The R180 orientation can be 180 degree rotation of the R0 orientation.

Turning to the M7-M5 group, vte_pwr_tile_m7m5 can be a cell for forming M7-M5 mosaics that are placed in areas that are bigger than 16.64×16.64 microns, with R0 orientation. Meanwhile, vte_pwr_tile_sub_m7m5 can be a sub cell for forming cell vte_pwr_tile_m7m5 using R0, MY, MX, and R180 orientations for the sub cell. The sub cell vte_pwr_tile_sub_m7m5 can be placed individually in areas that are bigger than 8.32×8.32 microns but smaller than 16.64×16.64 microns. Furthermore, vte_pwr_tile_sub_ 1_m7m5 to vte_pwr_tile_sub_4_m7m5 can be deep-sub-tiles for forming sub cell vte_pwr_tile_sub_m7m5 using the R0 orientation. These deep-sub-tiles can be placed individually in areas that are bigger than 4.16×4.16 microns but smaller than 8.32×8.32 microns. The orientation of the deep-sub-tile can always be in the R0 orientation with respect to a given sub-tile, but since the sub-tile can be in a variety of orientations, the deep-sub-tile can inherit the orientation of its corresponding sub-tile. Of course, reference here is made to a sub-tile, though the sub-tile may itself have been peeled to be replaced with those deep-sub-tiles that can be placed without violating design rules.

Turning to the M5-M3 group, vte_pwr_tile_m5m3 can be a cell tile for forming M5-M3 mosaics that are placed in areas that are bigger than 4.16×4.16 microns. Likewise, vte_pwr_tile_sub_m5m3 can be a sub cell tile for forming cell vte_pwr_tile_m5m3 by using R0, MY, MX, and R180 orientations. The vte_pwr_tile_sub_m5m3 sub cell tiles can be placed individually in areas that are bigger than 2.08×2.08 microns but smaller than 4.16×4.16 microns. Similarly, deep-sub-tiles vte_pwr_tile_sub_1_m5m3 to vte_pwr_tile_sub_ 4_m5m3 can be used to form sub cell vte_pwr_tile_sub_m5m3 using R0 orientation (with respect to the sub-tile). Individually, these deep-sub-tiles can be placed in areas that are bigger than 1.02×1.02 microns but smaller than 2.08×2.08 microns with the orientation a sub cell would have been placed.

Figure 4:
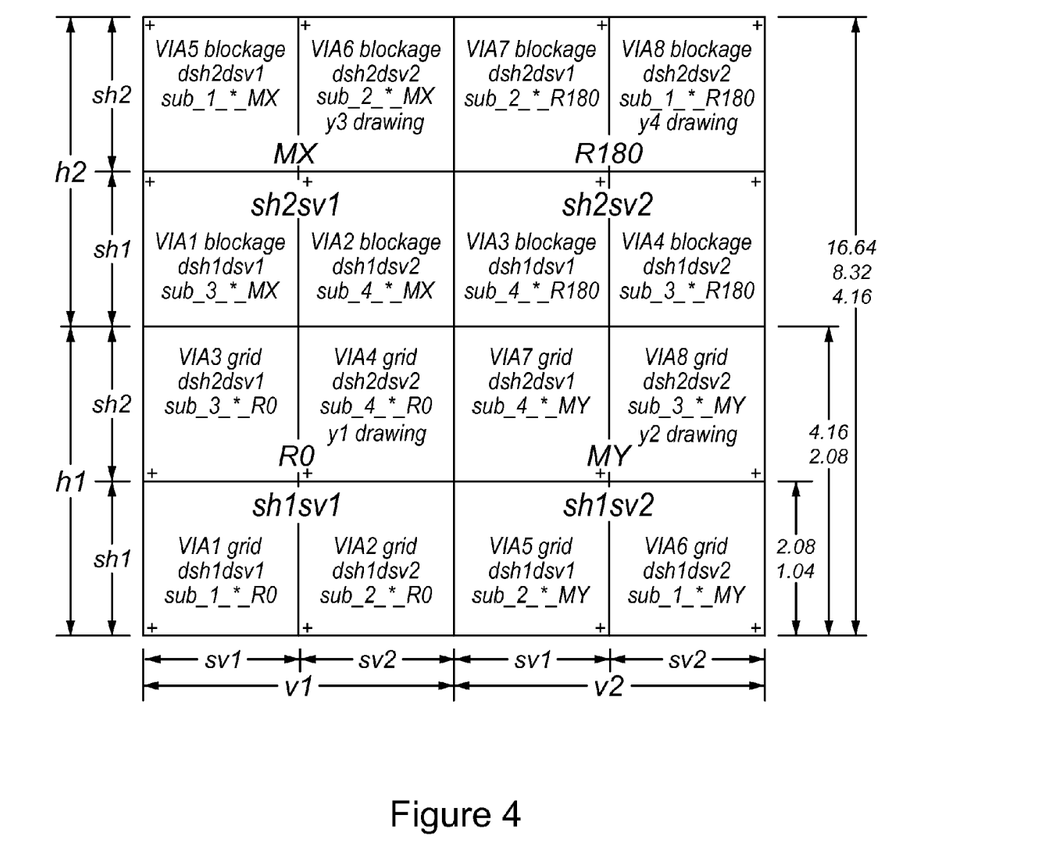
FIG. 4 is a block diagram illustrating tiles, sub-tiles, and deep-sub-tiles according to certain embodiments.

FIG. 4 illustrates alternative embodiments of a tile, sub-tile, deep-sub-tile technique. As can be seen in FIG. 4, a tile (which can have an overall pitch (length of a single side) of 16.64, 8.32, or 4.16 microns) can be made up of four sub-tiles, sh1sv1 (with orientation R0), sh1sv2 (with orientation MY), sh2v1 (with orientation MX), and sh2sv2 (with orientation R180). As can be seen from FIG. 4, within each sub-tile there can be four deep-sub-tiles (for example, sub_1_*_R0, sub_ 2_*_R0, sub_3_*_R0, and sub_4_*_R0). As can be seen, each of the deep-sub-tiles within a sub-tile has the same orientation as the other deep-sub-tiles in the same sub-tile. Moreover, the orientation of the deep-sub-tiles corresponds to the orientation of the sub-tiles in which they are located. The origin of each sub-tile is illustrated by a circle. The origin of each deep-sub-tile is illustrated by a "+" sign.

Based on the vte power grid definition (which can be adjusted as needed), the design flow can use 16.64 (microns) as tile size for m11m7 and m7m5 groups, and 4.16 as tile size for m5m3 as shown in FIG. 4.

A functionality of using a sub-tile and four deep-sub-tile cells can be applied to fine tune the tile coverage. The functionality can begin from a tile cell, which holds a pattern that can form mosaics to match the power grid. A complete pattern can be formed by a sub-tile cell in four different orientations, so only one sub-tile cell can be used to form the tile cell. A sub-tile cell can not be arrayed, but can be placed individually with a proper orientation. A sub-tile cell could not split in the same way as a tile cell, because there is no deep-sub-tile cell that can be placed in different orientations to form the sub-tile cell. Since a sub-tile cell still could occupy a sizeable area, and therefore could benefit from being sub-divided, the functionality can include further steps.

The sub-tile cell can be split into four deep-sub-tile cells. Each one of the deep-sub-tile cells corresponds to one quarter of the sub-tile cells, and each one of them can differ from the others. Additionally, they can have some parts overlapping, for example, to keep the metal and via integrity. When the deep cell tiles are abutting one another in the same orientation R0, they can form the sub-tile cell.

When a sub-tile cell is placed in certain orientation, say R180, all the four deep-sub-tile cells' orientation are also changed to R180. Thus, the sub-tile's orientation can determine the deep-sub-tiles' orientation.

More particularly, four construction layers of sh1, sh2, sv1, and sv2 in sub-tile pitch can be used to form four sets of sub-tile area, namely sh1sv1, sh1sv2, sh2sv1, and sh2sv2. One of the methods could be placing a sub-tile cell at a partial matching area, flatten the sub-tile to let it become four deep-sub-tile cells, and then remove those deep-sub-tile cells that are involved in a violation. This method can be done in SKILL®. However, another embodiment would be to resolve the violation issues inside Calibre® with more construction layers.

For example, four construction layers of dsh1, dsh2, dsv1, and dsv2 in deep-sub-tile pitch can be used to form four sets of deep-sub-tile areas, namely dsh1dsv1, dsh1dsv2, dsh2dsv1, and dsh2dsv2. Then, the system can find out the sub sets of the four deep-sub-tile sets that are outside of areas that have been occupied by good tile mosaic areas and individual sub-tile cell areas, to reduce the run time. Additionally, the system can find out yet another sub set of the four deep-sub-tile sets that are free of violations. Then, the system can separate the four sets into four groups formed by sub-tile cell construction layers, namely, sh1sv1, sh1sv2, sh2sv1, and sh2sv2, to form sixteen sub sets, in which each group contains four sub sets.

Because areas good for a complete sub-tile cell have already been filled, the leftover areas are those that can only be filled partially by a sub cell, in other words, they can only be filled by 1, 2, or 3 deep-sub-tile cells with same orientation. The orientation can depend on what sub-sets they are in, namely, sh1sv1(R0), sh1sv2(MY), sh2sv1(MX), or sh2sv2 (R180). Origin of an individual deep-sub-tile cell inside a sub-tile cell area is also depending on the sub-tile cell orientation as shown in FIG. 4.

When the deep-sub-tile cells are placed in a specific sub-tile area with its orientation, their combination should be the same as if a complete sub-tile cell is placed. Thus, even when there is no sub pattern that can be found to form a pattern by proper orientations, a set of deep-sub-tiles can still be used as described above, and each part can be different. In this example, the sub-tile is divided into four parts evenly, but there is no limitation on this. Uneven divisions can be used and other numbers of deep-sub-tiles can also be used, such as 16. When the pitch is getting ¹⁄₁₆th finer, it may be necessary to use many more construction layers with 64 different position-orientation possibilities. Thus, a particular embodiment can balance the gain and complexity to get the best performance.

Figure 5:
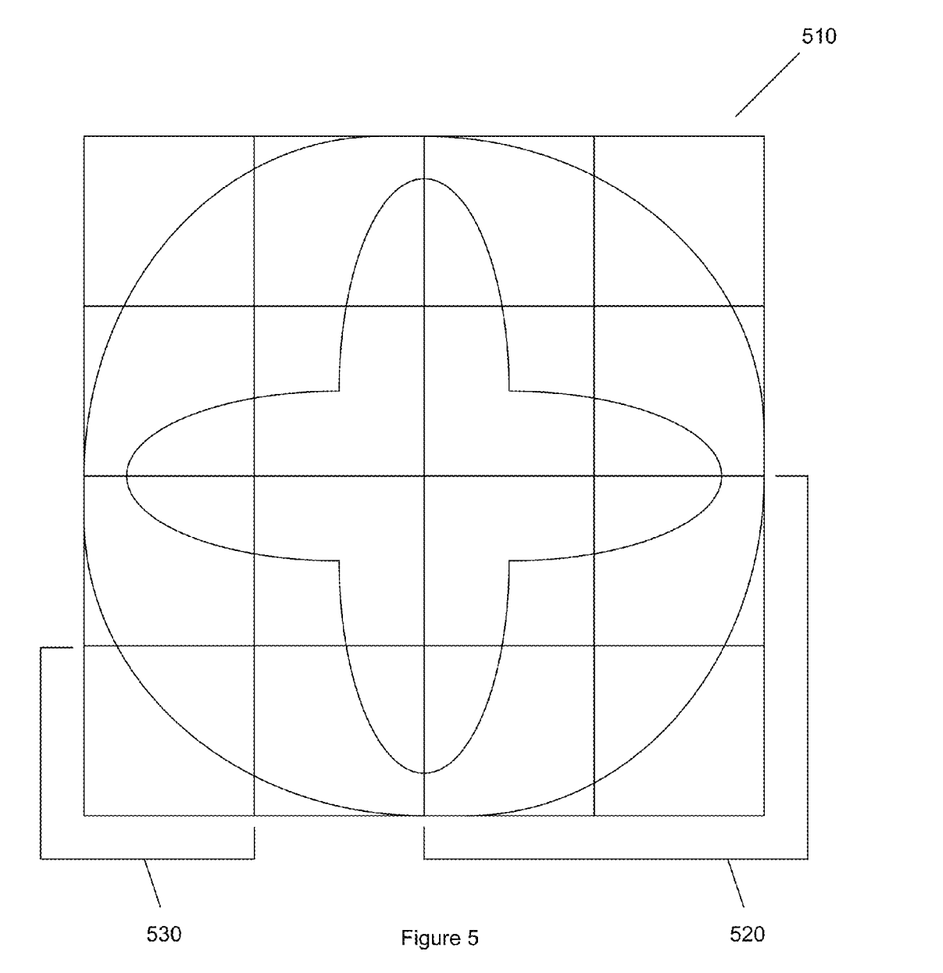
FIG. 5 illustrates tiles, sub-tiles, and deep-sub-tiles according to an embodiment.

The deep-sub-tiles can be various configured. For example, deep-sub-tiles can display an asymmetry such as that shown in FIG. 5. As shown in FIG. 5, the design of a tile cell 510 (here shown in a rose window pattern) can be constructed from four identical sub-tiles 520, which are simply rotations and/or mirror images of one another. Each sub-tile 520 can be composed of, for example, four asymmetrical deep-sub-tiles 530.

Figure 6:
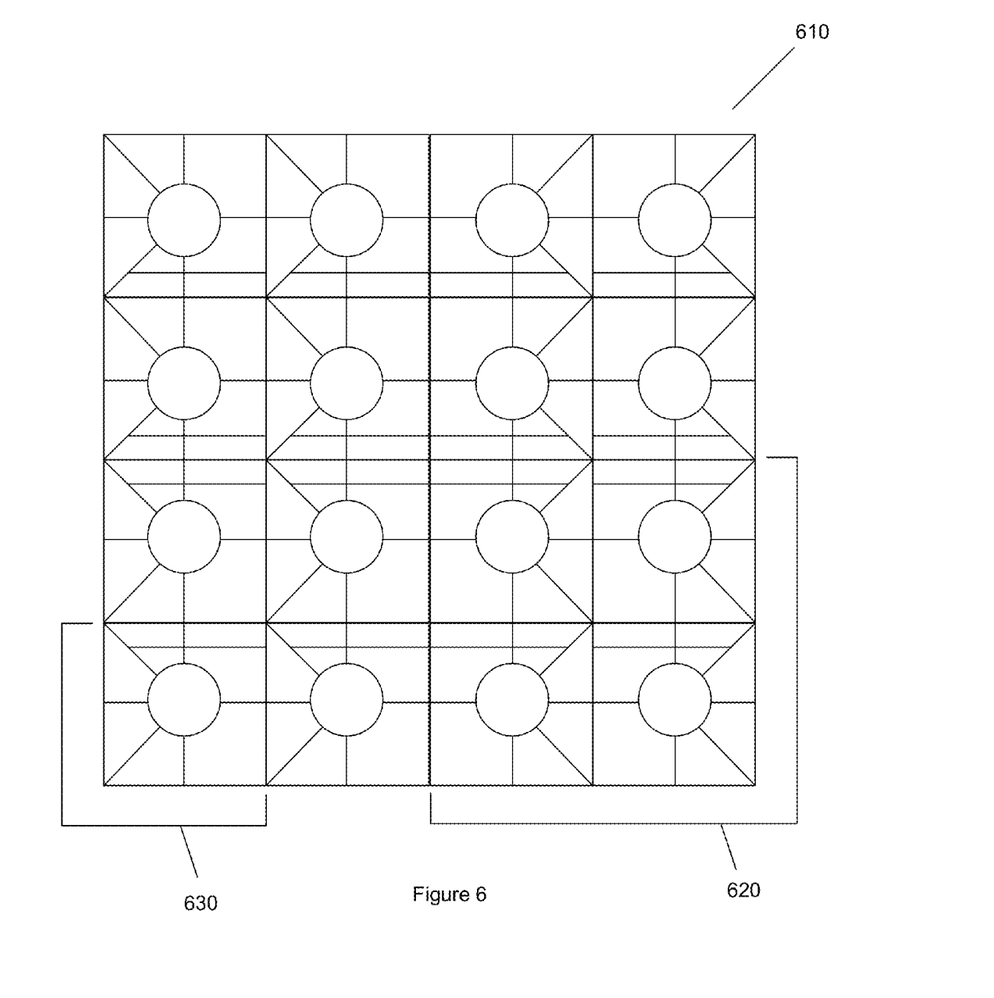
FIG. 6 illustrates tiles, sub-tiles, and deep-sub-tiles according to an alternative embodiment.

Alternatively, the deep-sub-tiles can be exactly identical to one another, as shown in FIG. 6. As shown in FIG. 6, the design of a tile cell 610 can constructed from sub-tiles 620 having deep-sub-tiles 630, which are identical to one another both in terms of pattern and orientation.

Figure 7:
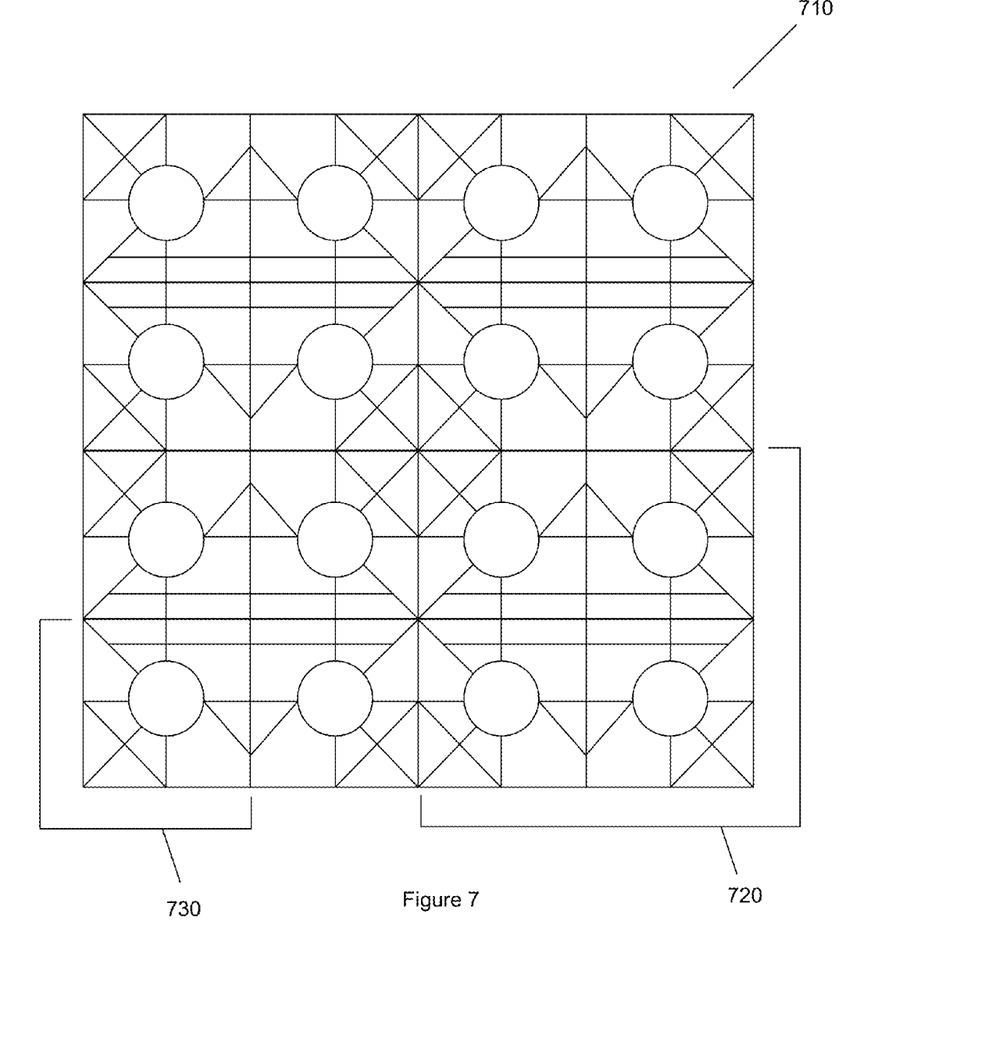
FIG. 7 illustrates tiles, sub-tiles, and deep-sub-tiles according to another alternative embodiment.

In a further alternative, the deep-sub-tiles can be related to one another as rotations and/or mirror images of one another. As shown in FIG. 7, the design of a tile cell 710 can be made up of four identical sub-tiles 720, which are simply rotations and/or mirror images of one another. Likewise, each sub-tile 720 can be composed of four identical deep-sub-tiles 730, which are simply rotations and/or mirror images of one another.

Other implementations are also possible. For example, the relationship between the tiles, sub-tiles, and deep-sub-tiles can be a fractal relationship, such that tiles are to sub-tiles as sub-tiles are to deep-sub-tiles. Moreover, this fractal relationship can optionally extend to deep-deep-sub-tiles, which serve as the constituent elements of deep-sub-tiles.

Figure 8:
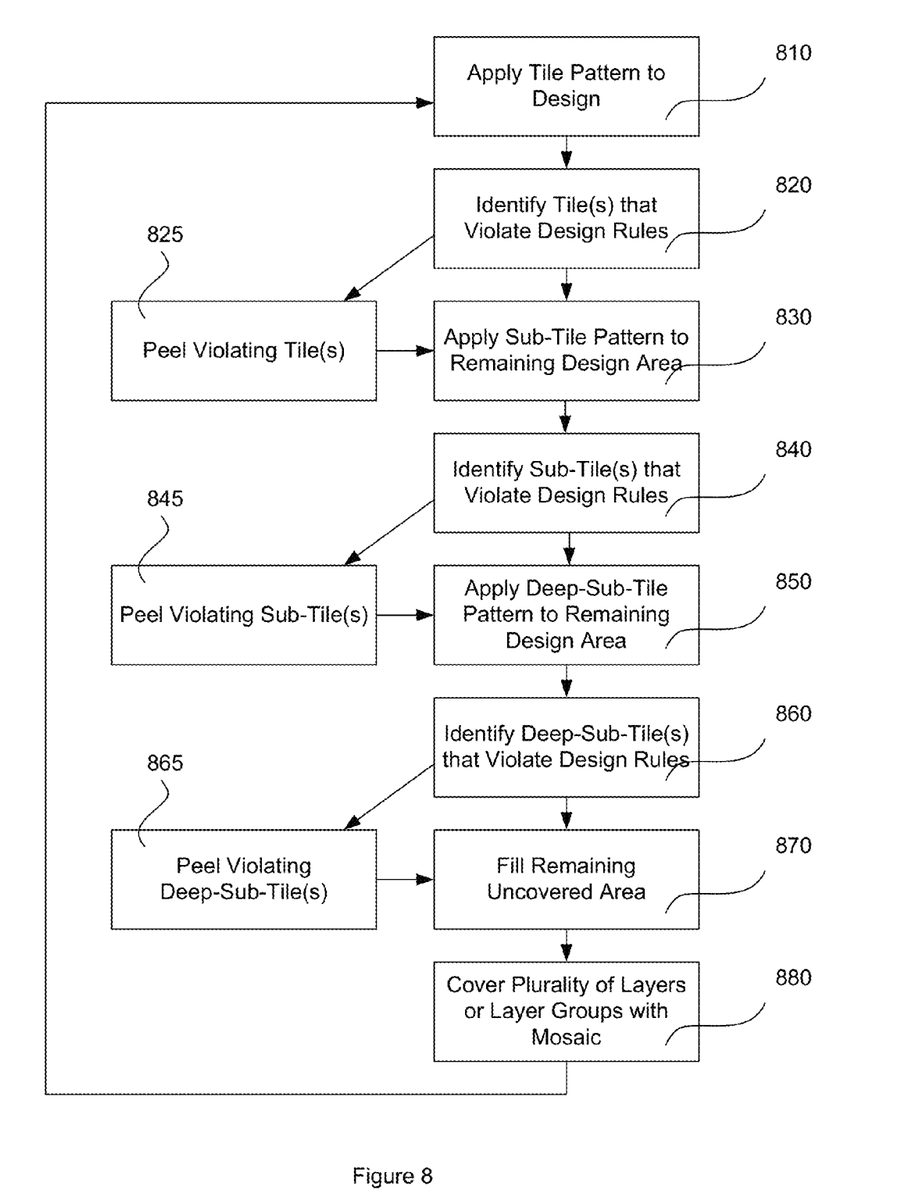
FIG. 8 is a flow diagram of the functionality of the tiling analysis module of FIG. 2 when determining coverage of a metal layer mosaic in accordance with one embodiment.

FIG. 8 illustrates a method according to certain embodiments. More specifically, FIG. 8 is a flow diagram of the functionality of tiling analysis module 16 of FIG. 2 when determining coverage of a metal layer mosaic in accordance with one embodiment. In one embodiment, the functionality of the flow diagram of FIG. 8 is implemented by software stored in memory or other computer readable or tangible medium, and executed by a single processor or multiple processors in parallel. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

As shown in FIG. 8, the functionality can include, at 810, applying a tile pattern to a design including at least one layer. The tile pattern can be applicable to a group of layers rather than to a single layer. Applying the tile pattern (or mosaic of cells) to the design can include repeatedly applying (for example, across the board) a standard cell in a single orientation to the design.

The functionality can also include, at 820, identifying one or more tile(s) of the tile pattern that violates one or more design rule(s). The identifying the tile of the tile pattern includes using a design rules checker to identify tiles that violate one or more design rule. Then, at 825, any violating tiles can be peeled (removed) from the design.

The functionality can further include, at 830, applying a sub-tile pattern to an area identified in the identifying the tile of the tile pattern that violates the design rule, that is, a remaining design area not covered by the tile pattern any longer. Applying the sub-tile pattern to the layer can include repeatedly applying a standard sub cell in a multiple related orientations to the leftover design area not covered by the tile pattern. The multiple related orientations can include mirror images and rotations of an original orientation, as well as the original orientation itself.

The functionality can additionally include, at 840, identifying one or more sub-tile of the sub-tile pattern that violates one or more design rule. The design rule here can be the same design rule as was violated with respect to the tile pattern, but can also be a different design rule. Identifying the sub-tile of the sub-tile pattern can include using a design rules checker to identify sub-tiles that violate one or more design rule. Then, at 845, any violating sub-tiles can be peeled (removed) from the design.

The functionality can also include, at 850, applying a deep-sub-tile pattern to an area identified in the identifying the sub-tile of the sub-tile pattern that violates the design rule. Applying the deep-sub-tile pattern to the leftover design area not covered by the tiles or sub-tiles can include repeatedly applying a standard deep sub cell in a multiple related orientations to the layer. The multiple related orientations can include mirror images and rotations of an original orientation, as well as the original orientation itself.

Within a sub-tile, all deep-sub-tiles in the deep-sub-tile pattern can have a same orientation. Indeed, all deep-sub-tiles in the deep-sub-tile pattern can have an orientation inherited from a sub-tile that the respective deep-sub-tile is replacing.

The functionality can further include, at 860, identifying one or more deep-sub-tile of the deep-sub-tile pattern that violates one or more design rule. As with the previous design rules, this design rule can be the same or different from the design rules violated previously. Identifying the deep-sub-tile of the deep-sub-tile pattern can include using a design rules checker to identify deep-sub-tiles that violate one or more design rule. Then, at 865, any violating deep-sub-tiles can be peeled (removed) from the design.

The functionality can additionally include, at 870, filling an area identified in the identifying the deep-sub-tile of the deep-sub-tile pattern that violates the design rule. This can be the area not covered either by the tile pattern, sub-tile pattern, or deep-sub-tile pattern.

The functionality can also include, at 880, covering a plurality of layers or layer groups with a mosaic wherein the layer includes a first layer of the plurality of layers and the mosaic includes a plurality of cells. This may be accomplished by repeatedly performing the steps described above. The plurality of layers can be divided into groups of layers. The groups of layers can be as small as two layers, or can have many layers. There may be a trade off between fine tuning and computational complexity that can be considered. When nearby layers may have similar violations (or similar freedom from violations), it may be practical to group them together. A first group the layers can be formed using only tile cells, in a second group the layers can be formed using tile cells and sub-tile cells, and in a third group the layers can be formed using tile cells, sub-tile cells, and deep-sub-tile cells.

The tile can have a pitch (the pitch is a measurement of one side of the tile, in the case of a square tile) of about 8 microns (for example, from about 4 microns to about 16 microns), wherein the sub-tile has a pitch of about 4 microns (for example, from about 2 microns to about 8 microns), and wherein the deep-sub-tile has a pitch of about 2 microns (for example, from about 1 micron to about 4 microns).

As disclosed, embodiments provide for coverage of a metal layer through the use of mosaicing. As a first attempt, cell tiles are used to cover a layer. Then, cell tiles that violate design rules are peeled and sub-tiles are placed. Then sub-tiles that violate design rules are peeled and deep-sub-tiles are placed. Finally, the remaining area of the layer is filled according to a more computationally intensive process. The technique can be tailored to the needs of a particular metal layer and can be used repeatedly in different ways in different metal layers in a single chip.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to determine coverage of a metal layer mosaic, the determining coverage comprising:
    applying a tile pattern formed of multiple tiles on one layer of multiple layers of an integrated circuit design;
    identifying one tile of the tile pattern that violates at least one first design rule, wherein the one tile covers a first geographic area;
    in response to the violation of the first design rule, removing the one violating tile of the tile pattern and generating and applying a sub-tile pattern to the first geographic area, wherein the sub-tile pattern comprises a plurality of sub-tiles that together cover the first geographic area, and wherein each sub-tile covers a second geographic area that is smaller than the first geographic area and wherein within the first geographic area, a first sub-tile of the plurality of sub-tiles has a different orientation than a second sub-tile of the plurality of sub-tiles;
    identifying one of the sub-tiles of the sub-tile pattern that violates at least one second design rule; and
    in response to the violation of the second design rule, removing the one violating sub-tile of the sub-tile pattern and generating and applying a deep-sub-tile pattern to the second geographic area, wherein the deep-sub-tile pattern comprises a plurality of deep-sub-tiles that together cover the second geographic area, and wherein each deep-sub-tile covers a third geographic area that is smaller than the second geographic area.

2. The non-transitory computer readable medium of claim 1, wherein applying the tile pattern to the design comprises repeatedly applying a standard cell in a single orientation to the design.

3. The non-transitory computer readable medium of claim 1, wherein applying the sub-tile pattern to the design comprises repeatedly applying a standard sub cell in a multiple related orientations to the design.

4. The non-transitory computer readable medium of claim 3, wherein the multiple related orientations comprise mirror images and rotations of an original orientation.

5. The non-transitory computer readable medium of claim 1, wherein applying the deep-sub-tile pattern to the design comprises repeatedly applying a standard sub cell in a multiple related orientations to the design.

6. The non-transitory computer readable medium of claim 5, wherein the multiple related orientations comprise mirror images and rotations of an original orientation.

7. The non-transitory computer readable medium of claim 5, wherein within a sub-tile, all deep-sub-tiles in the deep-sub-tile pattern have a same orientation.

8. The non-transitory computer readable medium of claim 5, wherein all deep-sub-tiles in the deep-sub-tile pattern have an orientation inherited from a sub-tile that the respective deep-sub-tile is replacing.

9. The non-transitory computer readable medium of claim 1, the determining coverage further comprising:
identifying at least one deep-sub-tile of the deep-sub-tile pattern that violates at least one third design rule.

10. The non-transitory computer readable medium of claim 9, the determining coverage further comprising:
filling an area identified in the identifying the at least one deep-sub-tile of the deep-sub-tile pattern that violates the third design rule.

11. The non-transitory computer readable medium of claim 1, the determining coverage further comprising:
covering a plurality of layers with a mosaic wherein the layer comprises a first layer of the plurality of layers and the mosaic comprises a plurality of cells.

12. The non-transitory computer readable medium of claim 11, wherein the plurality of layers are divided into groups of layers.

13. The non-transitory computer readable medium of claim 12, wherein in a first group the layers are formed using only tile cells, in a second group the layers are formed using tile cells and sub-tile cells, and in a third group the layers are formed using tile cells, sub-tile cells, and deep-sub-tile cells.

14. A computer implemented method to determine coverage of a metal layer mosaic, the method comprising:
applying a tile pattern formed of multiple tiles on one layer of multiple layers of an integrated circuit design;
identifying one tile of the tile pattern that violates at least one first design rule, wherein the one tile covers a first geographic area;
in response to the violation of the first design rule, removing the one violating tile of the tile pattern and generating and applying a sub-tile pattern to the first geographic area, wherein the sub-tile pattern comprises a plurality of sub-tiles that together cover the first geographic area, and wherein each sub-tile covers a second geographic area that is smaller than the first geographic area and wherein within the first geographic area, a first sub-tile of the plurality of sub-tiles has a different orientation than a second sub-tile of the plurality of sub-tiles;
identifying one of the sub-tiles of the sub-tile pattern that violates at least one second design rule; and
in response to the violation of the second design rule, removing the one violating sub-tile of the sub-tile pattern and generating and applying a deep-sub-tile pattern to the second geographic area, wherein the deep-sub-tile pattern comprises a plurality of deep-sub-tiles that together cover the second geographic area, and wherein each deep-sub-tile covers a third geographic area that is smaller than the second geographic area.

15. The computer implemented method of claim 14, further comprising:
identifying at least one deep-sub-tile of the deep-sub-tile pattern that violates at least one third design rule.

16. The computer implemented method of claim 15, further comprising:
filling an area identified in the identifying the at least one deep-sub-tile of the deep-sub-tile pattern that violates the third design rule.

17. A computer aided design system comprising:
a processor; and
a non-transitory computer readable medium coupled to the processor;
wherein the processor, when executing instructions stored on the medium, determines coverage of a metal layer mosaic, the coverage determination comprising:
applying a tile pattern formed of multiple tiles on one layer of multiple layers of an integrated circuit design;
identifying one tile of the tile pattern that violates at least one first design rule, wherein the one tile covers a first geographic area;
in response to the violation of the first design rule, removing the one violating tile of the tile pattern and generating and applying a sub-tile pattern to the first geographic area, wherein the sub-tile pattern comprises a plurality of sub-tiles that together cover the first geographic area, and wherein each sub-tile covers a second geographic area that is smaller than the first geographic area and wherein within the first geographic area, a first sub-tile of the plurality of sub-tiles has a different orientation than a second sub-tile of the plurality of sub-tiles;
identifying one of the sub-tiles of the sub-tile pattern that violates at least one second design rule; and
in response to the violation of the second design rule, removing the one violating sub-tile of the sub-tile pattern and generating and applying a deep-sub-tile pattern to the second geographic area, wherein the deep-sub-tile pattern comprises a plurality of deep-sub-tiles that together cover the second geographic area, and wherein each deep-sub-tile covers a third geographic area that is smaller than the second geographic area.

18. The computer aided design system of claim 17, further comprising:
a design rules checker, wherein the design rules checker is configured to identify tiles that violate the at least one first design rule.

19. The computer aided design system of claim 17, further comprising:
a design rules checker, wherein the design rules checker is configured to identify tiles that violate the at least one second design rule.

20. The computer aided design system of claim 17, further comprising:
a design rules checker, wherein the coverage determination further comprises identifying at least one deep-sub-tile of the deep-sub-tile pattern that violates at least one third design rule, wherein the design rules checker is configured to identify deep-sub-tiles that violate the at least one third design rule.

* * * * *

UNITED STATES PATENT AND TRADEMARK OFFICE
CERTIFICATE OF CORRECTION

PATENT NO. : 8,719,756 B2
APPLICATION NO. : 13/267081
DATED : May 6, 2014
INVENTOR(S) : Li et al.

It is certified that error appears in the above-identified patent and that said Letters Patent is hereby corrected as shown below:

In the Specification

In column 7, line 32, delete "mosiac." and insert -- mosaic. --, therefor.

Signed and Sealed this
Fourteenth Day of October, 2014

Michelle K. Lee
*Deputy Director of the United States Patent and Trademark Office*